Dec. 6, 1932.  A. H. SHOEMAKER  1,890,133
EXPANDING CORE AND MOLD FOR PNEUMATIC TIRES
Filed Oct. 29, 1930

INVENTOR
Alvin H. Shoemaker
BY
Fred C. Matheny
ATTORNEY

Patented Dec. 6, 1932

1,890,133

UNITED STATES PATENT OFFICE

ALVIN H. SHOEMAKER, OF SEATTLE, WASHINGTON

EXPANDING CORE AND MOLD FOR PNEUMATIC TIRES

Application filed October 29, 1930. Serial No. 491,943.

My invention relates to an expanding core for use in connection with a mold or similar container in the manufacture of pneumatic tires and the general object of my invention is to provide apparatus of this nature embodying an expansible core whereon a tire of raw or partly cured materials may be built up or may be placed after it is built up, said core being constructed so that it may be expanded by the introduction thereinto of fluid pressure after said core with the tire thereon has been placed in a mold or external container to thereby exert tension on the reinforcing means in the tire and to place the material of which the tire is formed under a relatively high compression while the tire is being cured or subjected to a vulcanizing process by the application of heat.

Another object of my invention is to provide an expanding core embodying two discs capable of retaining fluid under pressure, said discs being mounted in side by side relation and said discs having annular core portions of an external shape corresponding to a desired internal shape of a tire, extending around their outer edges, whereby a tire may be placed upon said core portions in the course of manufacture, said discs affording relatively large areas against which fluid pressure may be exerted to thereby expand the core portions and place the material of the tire under relatively high pressure after the tire and core have been placed in a mold or annular container and during the process of curing and vulcanizing the tire, said high pressure producing an even distribution of the material of which the tire is made.

A further object of the invention is to provide an expanding core within which a heated fluid, as steam under pressure, may be introduced, thereby applying heat to the interior of the tire in a manner which reduces the time required for vulcanizing or curing and makes possible a better and more efficient cure of said tire.

A further advantage resides in the fact that the live steam is permitted to come into direct contact with the inner wall of the tread portion of the tire thus giving a better cure to this portion of the tire than would be obtained by the application of dry heat.

Other and more specific objects of the invention will be apparent from the following description taken in connection with the accompanying drawing.

In the drawing Figure 1 is a diametrical cross sectional view on broken line 1—1 of Fig. 3, of an expanding core constructed in accordance with my invention, showing the core in a mold in operative position, but omitting the tire.

Figure 1:
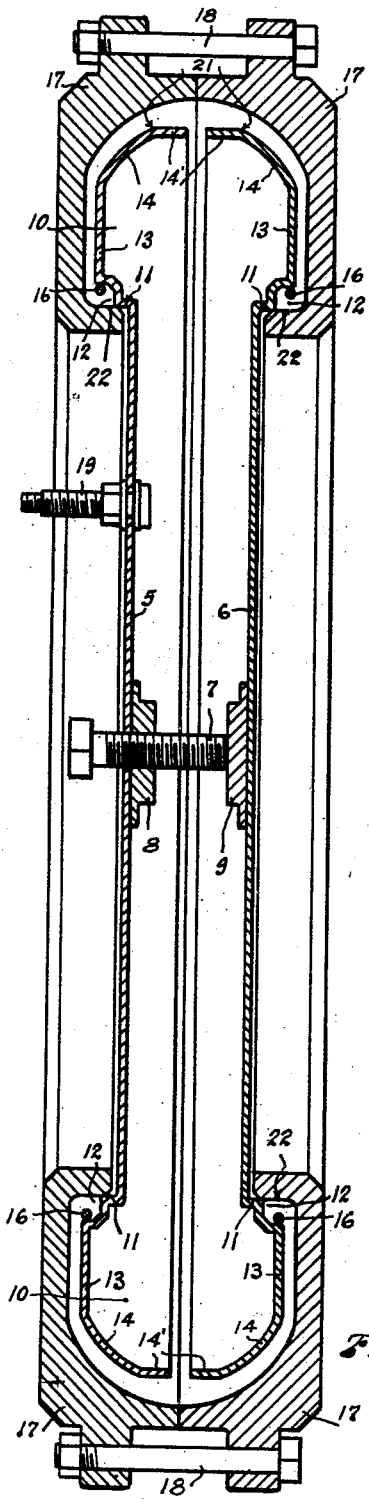

Referring to the drawing, throughout which like reference numerals designate like parts, 5 and 6 designate two discs of relatively strong material capable of retaining fluid under pressure, as steam or air. When in use the discs 5 and 6 are disposed in substantially parallel, spaced apart, relation and said discs are provided with mechanical means, as a centrally located screw 7, which is threaded through a hub 8 on one disc and abuts against a plate 9 on the other disc, for spreading said discs apart.

Figure 2:
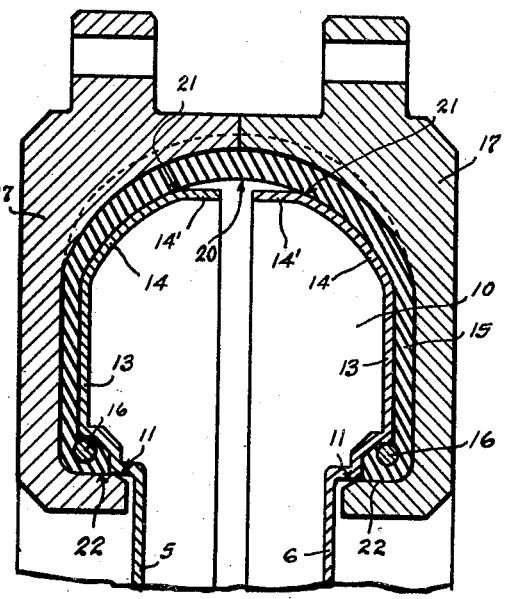
Fig. 2 is a fragmentary sectional view on a larger scale taken on a radial line through the core and mold, showing a tire compressed therein.
Figure 3:
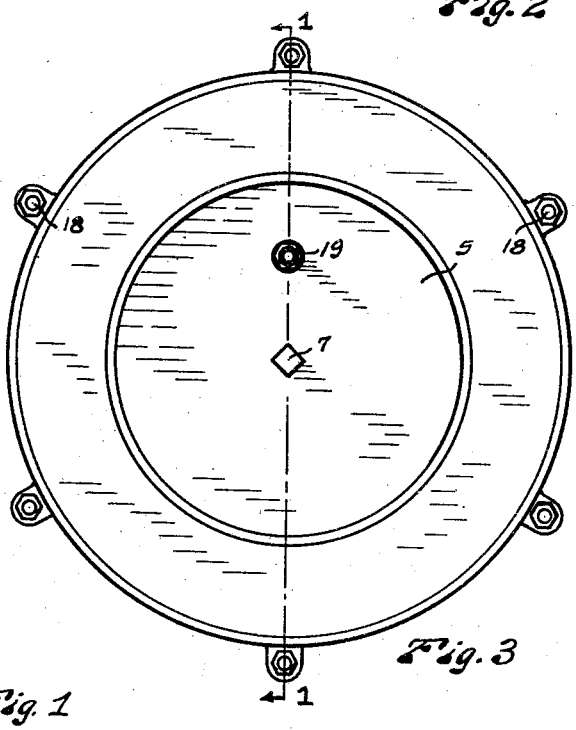
Fig. 3 is an elevation on a smaller scale of my core and mold.

Core members are provided on the respective marginal or circumferential portions of said discs, said core members extending continuously around the discs and protruding convexly outward in sidewise directions beyond the planes of the discs and being externally shaped to conform to the internal shape of tires which are to be molded. The core members are preferably concave on the inside to afford a chamber 10 which opens into the space between the discs. Each core member has an external annular shoulder 11, positioned at the location where the core member joins the disc; and further has an external annular bead-forming recess 12 positioned adjacent the shoulder 11. Each core member has a side wall 13, which may be plane, as shown, or which may be curved, and each core member further has an annular tread forming portion 14, of curved cross section, which preferably terminates in an annular portion 14' of relatively flat cross section. When two of the above described core portions are placed together with the edges of the tread parts 14' in contact they form a core upon which raw or partly cured rubber and reinforcing material may be placed to build up a tire 15. The core portions may be separable from the discs if desired. A bead molding ring 16 is provided in connection with each core member. These bead molding rings do not become permanently embedded in a tire but are detachable from the tire after it is cured and are necessarily removed before the cured tire can be taken off of the core. These rings are laid into the tire in the manner shown in Fig. 2, whereby said mold rings may be removed after the tire is finished and other bead rings substituted in their place before the tire is applied to a rim.

After the unfinished tire has been built up on the contracted core, a sectional mold, preferably formed of two annular mold sections 17, separable on a medial plane, is placed over the tire and the two mold sections 17 are fixedly secured together, as by bolts 18, in such a manner as to completely enclose the tire. A shoulder 22 on the inner annular portion of each mold section is provided for receiving the shoulder 11 on the core, thus forming a seal at this point. The two parts of the mold are then initially expanded by the screw 7 to place the tire under enough pressure to preclude excess leakage of fluid between the walls of the tire and the walls of the core. Fluid under pressure, as hot steam, is then admitted through a valve 19 into the space between the two discs 5 and 6, and into the chamber 10 to expand the core and exert a relatively great pressure on the tire material, thus compressing said tire material and causing said tire material to thoroughly permeate the reinforcing cords and to flow and be distributed very evenly throughout the thicker tread portion and thinner side walls of the tire, leaving all parts of the tire of the desired thickness free from bumps and thin spots and other like defects. The core members being separable on a medial line will move apart and allow the hot steam or other hot fluid to come directly into contact with the inner wall of the tread portion of the tire, which hot steam or fluid under pressure will form a curved inner wall within said tread portion, as indicated at 20 in Fig. 2. This steam will not pass the points 21 and the remainder of the tire will be subjected to the direct pressure and dry heat of the walls of the core. It is generally recognized that rubber is better if cured in the presence of moist heat and this live steam thus subjects the tread portion of the tire to the most efficient curing. Any suitable non-skid design may be cut in the walls of the mold sections and the rubber will be caused by the internal pressure to conform accurately to such tread design.

The expansion of the mold will place the reinforcing cords, or like material with which the tire is reinforced, under tension during the curing process, thus taking up all excess slack in said reinforcing and contributing to the production of a better tire. In practice I prefer to use radial cord reinforcing without any longitudinal or diagonal reinforcing in the tire. The radial cords in this reinforcing will be very advantageously tensioned by the expansion of the mold.

By the use of an expanding hollow core of the form just described I am able to apply heat to both the inside and the outside of the tire in the curing process and thus to greatly reduce the time required for curing a tire. This greatly cheapens the cost of production and increases the output per mold. When heat is applied to the interior of the mold only it requires about two hours to cure a tire but when heat is applied to both interior and exterior the same tire can be cured in about forty minutes. This core and mold are also very durable thus keeping the cost of replacements low.

The foregoing description and accompanying drawing clearly disclose a preferred embodiment of my invention but it will be understood that this disclosure is merely illustrative and that such changes in the invention may be made as are fairly within the scope and spirit of the following claims.

I claim:

1. In combination a tire mold arranged to receive a pneumatic tire, an expansible core composed of a plurality of circular sections of relatively nonpliable material operatively disposed within said tire, side plate means on said core sections extending radially inward toward the center of said core and cooperating with the several core sections to thereby form a fluid tight cavity but leaving said core sections free to expand within the tire, and means for admitting fluid under pressure to said fluid tight cavity.

2. In apparatus for molding pneumatic tires, an expansible core formed of a plurality of circular metal sections arranged to have a tire assembled thereon, inwardly extending side plate means joined with the inner edges of said core sections and cooperating therewith to form a steam cavity and leaving said core sections free to expand within said tire, said core sections being of heat conductive material whereby both heat and pressure will be applied to the inner walls of the tire, and retaining means for receiving said tire and core.

3. In apparatus for molding pneumatic tires, an annular mold member composed of two halves separable on a medial plane, and an annular expansible core composed of two halves separable on a medial plane and capable of being enclosed within a tire in said mold member, side plate means on said core halves extending circumferentially inward to locations external to said mold and cooperating with said tire and said core halves to form a fluid tight receptacle, and means for admitting steam under pressure to said receptacle.

4. In apparatus for molding pneumatic tires, an annular sectional mold member, and an annular expansible core disposed within said mold member, said core being composed of two parts separable on a medial plane, the two parts of said core member being continuous circles and cooperating with said tire to form a fluid tight receptacle, and means for admitting steam under pressure to said receptacle.

5. In combination an annular tire mold arranged to enclose a tire, an expanding core comprising two discs having peripheral core portions disposed within said mold, and means for admitting fluid under pressure into the space between said discs to expand said core portions within said mold.

6. In expanding core apparatus for pneumatic tires, two disc members having circumferential core portions which are externally convex to correspond to a desired internal shape of a tire whereby a tire to be cured may be placed on said core portions, means for enclosing said tire and core, and means for admitting fluid under pressure between said discs to expand said core.

7. In expanding core apparatus for molding pneumatic tires, two spaced apart metal discs having circumferential core portions of external shape corresponding to a desired internal shape of a pneumatic tire, whereby a tire to be molded may be placed over said core portions, an annular mold enclosing said core portions, and means for admitting fluid under pressure to the space between said discs and within said core portions.

8. An expanding core and mold for pneumatic tires, embodying two metal discs disposed side by side, annular bowl shaped core portions on the margins of said discs whereby a tire which is to be vulcanized may be placed on said core portions, a removable annular mold enclosing the core and supporting the exterior of the tire, and means for admitting steam between said discs and within said core whereby said core will be expanded within said mold.

9. An expanding core and mold for pneumatic tires, embodying two metal discs disposed side by side, two annular core portions of bowl shaped cross section formed on the respective margins of said discs, the convex sides of said core portions being directed outwardly whereby a tire may be built up on said core portions, a removable sectional mold enclosing said core with the tire thereon, mechanical means for exerting an outward pressure on the two parts of said core and means for admitting fluid under pressure into the space between said discs whereby said core will be expanded and said tire maintained under pressure between said core and said mold.

10. An expanding core and mold for use in the manufacture of pneumatic tires, embodying two metal discs disposed side by side, two annular core portions of bowl shaped cross section on the respective margins of said discs, said core portions projecting outwardly beyond the planes of said discs and having annular shoulders at the locations where they connect with said discs and said core portions having external bead forming recesses adjacent said shoulders said core portions having side wall and tread portions whereby a tire which is to be cured may be built up thereon, a removable sectional mold enclosing said tire on said core and having internal shoulders engaging with said external shoulders of said mold, and means for admitting fluid under pressure to the space between said discs whereby said core will be expanded and said tire compressed between said core and said mold.

11. An expanding core and mold for use in the manufacture of pneumatic tires, embodying two metal discs disposed side by side, two annular core portions of bowl shaped cross section on the respective margins of said discs, said core portions projecting outwardly beyond the planes of said discs and having annular shoulders at the locations where they connect with said discs and said core portions having external bead forming recesses adjacent said shoulders said core portions having side wall and tread portions whereby a tire which is to be cured may be built up thereon, a mold enclosing said tire and said core said mold being formed of two halves separable in a medial plane, and means for admitting fluid under pressure to said core whereby said core will be expanded and said tire compressed, said core being separable at the location of the tread portion of the tire whereby the fluid pressure will be in direct contact with the inner tread portion of the tire.

In testimony whereof I affix my signature.

ALVIN H. SHOEMAKER.